United States Patent [19]

Silberg

[11] 4,187,489
[45] Feb. 5, 1980

[54] METHOD AND APPARATUS FOR PROPAGATING ELECTRICAL SIGNALS THROUGH A CONDUCTING DIELECTRIC FLUID

[76] Inventor: Paul A. Silberg, 2002 Woody Dr., Billings, Mont. 59102

[21] Appl. No.: 900,767

[22] Filed: Apr. 27, 1978

[51] Int. Cl.² .......................................... H04B 13/02
[52] U.S. Cl. ...................................... 340/852; 325/28
[58] Field of Search .................. 340/4 E, 4 A; 325/28

[56] References Cited

U.S. PATENT DOCUMENTS

| | | | |
|---|---|---|---|
| 3,230,506 | 1/1966 | Hellund | 340/4 E |
| 3,497,869 | 2/1970 | Silverman | 340/4 E |
| 3,946,354 | 3/1976 | Keck | 340/4 E |

Primary Examiner—Richard A. Farley
Attorney, Agent, or Firm—Thorpe, North & Gold

[57] ABSTRACT

Apparatus for propagating electrical signals through a conducting dielectric fluid such as salt water includes a pair of electrodes, one of which is a point electrode composed of a nipple or finger-like member, and the other of which is a plane electrode composed of an annular plate. The two electrodes are immersed in the conducting dielectric fluid and spaced apart along an axis and then electrical energy is applied to the two electrodes to produce a varying voltage therebetween. The voltage difference is modulated in accordance with information to be transmitted and, as a result, a time-varying polarization field is produced in the conducting medium and this field propagates through the medium.

17 Claims, 9 Drawing Figures

METHOD AND APPARATUS FOR PROPAGATING ELECTRICAL SIGNALS THROUGH A CONDUCTING DIELECTRIC FLUID

BACKGROUND OF THE INVENTION

This invention relates to method and apparatus for propagating an electrical signal in the form of a polarization field through a conducting dielectric medium such as salt water.

The desirability of transmitting signals through a medium such as sea water is well known. The uses of such transmission could include surface to submarine communications and vice versa, communication between two or more submarines or underwater vessels, communication with untethered underwater divers, the remote guidance of torpedoes, etc. Prior attempts to propagate electrical signals through a medium such as sea water have typically involved "brute force" adaptations of known techniques for transmitting electromagnetic signals through the air. Such attempts have either not proved successful or have been found to be impractical or very costly.

SUMMARY OF THE INVENTION

It is an object of the present invention to provide a novel method and apparatus for propagating electrical signals through a conducting dielectric fluid.

It is another object of the present invention to provide such a method and apparatus which is simple in implementation and construction.

It is a further object of the present invention to provide such a method and apparatus which minimizes losses normally associated with conventional ohmic conduction.

These and other objects of the present invention are realized in a specific illustrative embodiment thereof which includes a point electrode immersed in a conducting dielectric fluid, and a plane electrode also immersed in the fluid and spaced apart from the point electrode along a certain axis. The plane electrode has a generally planar profile whereas the point electrode is considerably smaller in height and width dimension than the plane electrode. Also included is apparatus for applying electrical energy to the point and plane electrodes to produce a time-varying voltage difference therebetween. Such a time-varying voltage difference results in the production of an anomalous, nonuniform time-varying electric field between the point and plane electrodes and this, in turn, produces a polarization field which is propagated outwardly from the two electrodes.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

Figure 1A:
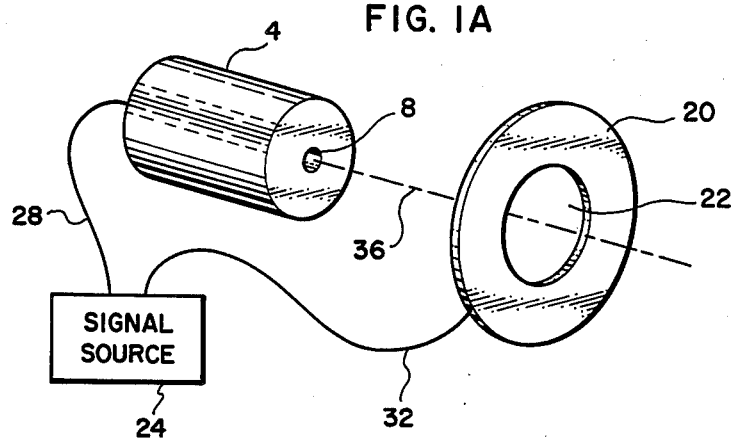
FIG. 1A is a perspective view of one illustrative embodiment of apparatus for propagating electrical signals through a conducting fluid made in accordance with the present invention.

Before describing the several embodiments of the invention shown in the accompanying drawings, a brief background of the theory on which the present invention is based will be given. It is well known that in a conducting dielectric fluid, the atoms of the fluid are electrically neutral and so any contribution to the average charge density in the fluid would be from the presence of ions. This ionic contribution corresponds to what is called the free charge density and it occurs only in a conducting medium. The current derived from this free charge density involves the motion of ions and is called the conduction current.

In dielectrics, according to Maxwell's theory (Rosenfeld, L., "Theory of Electrons", Dover Publishing Co., Inc., N.Y., N.Y., 1965; Fano, R. M., Chu, L. J. and Adler, R. B., "Electromagnetic Fields, Energy and Forces", the MIT Press, Cambridge, Mass., 1960, p. 161 et seq; "Classical Electricity and Magnetism", Panofsky and Phillips, Addison-Wesley, 1962, Chap. 6), there is another contribution to the charge density, and this contribution appears only in regions of inhomogeneity, for example, at the surface separating two different dielectrics. On the atomic level, the origin of this charge density is sought in changes of the density of the distribution of atoms or molecules at the boundary (surface of separation) of two adjacent volume elements. Imagine for a moment that the whole charge of each atom is concentrated at some point of the interior of the atom so that there is no average density. If the original charge distribution is then restored by moving each charge element back to the point which it actually occupies, this will make no difference insofar as the atoms situated entirely within the boundaries of the physically infinitesimal volume element are concerned. But, if an atom is cut by the boundary of the volume element, part of the charge will remain in this volume element while the rest will contribute to the charge contained in the adjacent volume element. If the distribution of atoms is uniform this boundary effect will again cancel on the average, but if there is an inhomogeneity in the distribution of atoms a net effect will result which is the above-noted contribution to the charge density. It should be noted that the just described effect is a micro-effect or an internal field effect. Consequently, the density of conduction electrons or ions has no effect on it. In other words, the density or average motion of conduction electrons or ions has no effect on the internal field of the dielectric.

Any propagation of electrical signals through a conducting medium must follow or be describable by Maxwell's equations. Maxwell's equations have been solved for a conducting medium (Kraichman, M. B., "Handbook of E. M. Propagation in Conducting Media", U.S. Govt. Printing Office, 1970 NAVMAT P-2302; Moore, R. K., "Radio Communication in the Sea", IEEE Spectrum, Sept., 1967) and the solutions are well known. According to the cited references, no anomalous propagation exists for a conducting dielectric fluid (sea water) with the signal decay being governed by the conductivity of the fluid. In other words, any electric field E that exists in sea water would have to be maintained by an electric conduction current $J_c$ whose magnitude is governed by ohms law, i.e., $$E = J_c/\sigma \text{ or } J_c = \sigma E$$

where $\sigma$ is the conductivity. For sea water $\sigma$ is quite large so that large currents are required to maintain the field. Consequently, it appears at first glance that no anomalous propagation can exist for a conducting dielectric medium unless it violates Maxwell's equations, ohms law, or both. This is not the case however as will next be shown.

For a conducting medium the charge density $\rho$ can be written as $$\rho = \rho_c + \rho_1 + \rho_2 + \cdots$$

and the corresponding current density J as $$J = J_c + J_1 + J_2 + \cdots$$

Here $\rho_c$ is the charge density of the conducting ions and is the resulting conduction current density. The other charge and current densities refer to the other possible phenomena previously discussed. Now the situation is saved by the fact that the law of conservation of charge is satisfied independently by each pair of charge and current densities and as a result (previously cited Fano et al reference at p. 166).

$$\nabla \cdot J_i = -(\partial \rho_i / \partial t)$$

for each derivable charge and current. Since the resulting electric field is derivable from the current distribution by the constitutive relations it turns out that each charge and current distribution has its own field. In other words, $$E_i = f(J_i)$$

where $f(J_i)$ is some function of the $i^{th}$ current density. Consequently, each charge and current density and their associated electric field are described by their own "Maxwell's equation".

It has been shown by Rosenfeld and Fano et al (previously cited) that the polarization charge density is given as $$\rho_p = -\nabla \cdot (P - \nabla \cdot Q)$$

where P is the polarization vector and Q the electric quadrapole tensor.

The polarization current density is thus given as $$J_p = \partial P / \partial t.$$

Note that in the use of linear conduction currents, $E = J/\sigma$, and only transverse electric fields are practically possible. However, with the use of the anomalous modes, $E = F(J)$, and longitudinal electric fields are also possible and are based upon the above discussed theory.

This theory explains in a general way the propagation of electrical signals or fields in a conducting dielectric fluid and such propagation has been demonstrated by experiment. A brief amplification of the theory as it applies to the point-plane electrode configuration of the drawings will next be given.

As previously pointed out, present technology makes use of ohmic conduction current, $J_c = \sigma E$, to generate the propagating field. Here, instead, the polarization current $J_p = \partial P / \partial t$ is used. Consequently, any way that the polarization can be changed or varied in the conducting medium as a function time will give a polarization current and a propagating field. For example, assume that a small bubble can be created in the conducting fluid quite rapidly and similarly can decay. This act changes the polarization in the conducting medium in the neighborhood of the bubble as a function of time and thus, satisfies the requirement for a polarization current; a field propagates. In the present invention, bubbles are not generated, but the polarization is varied within the medium to some degree in the neighborhood of the point electrode by impressing a voltage between the point and the large electrode nearby, thus, to a very slight degree, compressing the fluid. This slight compression changes the polarization of the medium in the neighborhood of the point (or compression) and defines a polarization current which then propagates as a field.

Figure 1B:
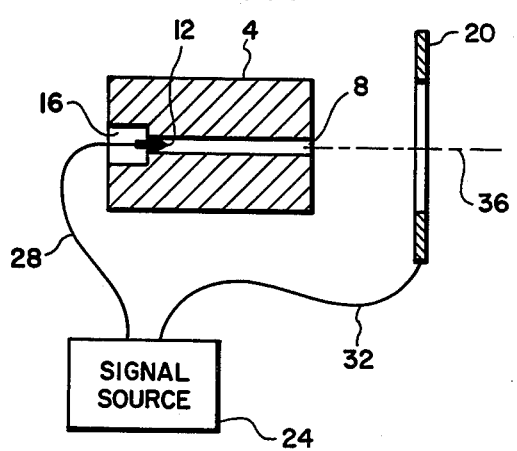
FIG. 1B is a side cross-sectional view of one species of the embodiment of FIG. 1A.
Figure 1C:
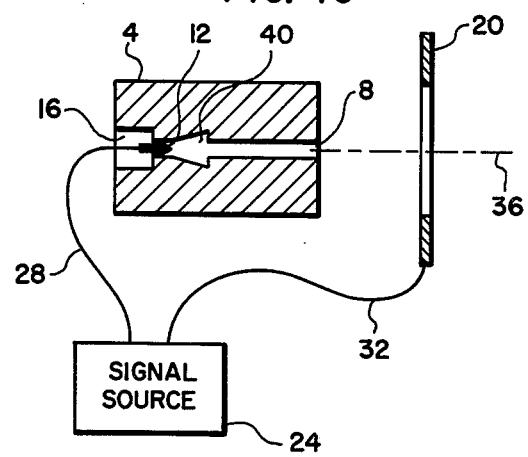
FIG. 1C is a side cross-sectional view of another species of the embodiment of FIG. 1A.

Referring now to the drawings and in particular to FIG. 1A, there is shown one specific embodiment of the present invention which includes a generally cylindrical body of nonconducting material 4. A bore 8 is formed in the body 4 to extend generally coincident with the cylinder axis from one end thereof to near the other end. Located in the other end of the body 4 is a finger-like point electrode 12 (as best seen in FIGS. 1B and 1C). The electrode 12 is disposed in a sealant material 16 to protrude into the bore 8. The sealant material 16 simply provides for carrying the electrode 12 in the end of the body 4 and for sealing and insulating the electrode from the conducting dielectric fluid, except through the bore 8. In other words, the only contact the electrode 12 has with the fluid is through the bore 8.

The embodiment of FIG. 1A also includes a plane electrode 20 in the form of an annular plate having an opening 22 therein as shown in the drawing. A signal source 24 is coupled by way of insulated conductors 28 and 32 respectively to the point electrode 12 and to the plane electrode 20. The signal source 24 is a conventional voltage source which produces and applies to the point electrode 12 and plane electrode 20 voltage signals to produce a time-varying voltage difference between the two electrodes.

To produce the signals for propagation in a conducting fluid, the body of material 4 and plane electrode 20 are immersed in the conducting dielectric fluid so that the bore 8 is coincident with an axis 36, and so that the plane of the electrode 20 is generally perpendicular to the axis 36, with the axis extending through the center of the opening 22 in the electrode. The signal source 24 then applies the voltage signals to the point electrode 12 and the plane electrode 20 to produce a time-varying voltage difference therebetween and this results in the production of a time-varying, non-uniform electric field between the point electrode and the plane electrode. Non-uniformity of the field results from providing a point electrode having height and width dimensions considerably less than those of the plane electrode. As indicated in the earlier discussion of the theory of the present invention, generation of this electric field produces a polarization current and, as a result, a polarization field is propagated along axis 36 outwardly from the body 4 and plane electrode 20. The voltage signals applied by the signal source 24 to the electrodes are modulated in accordance with the information to be transmitted in a conventional fashion.

As a matter of additional explanation, the voltage between the two electrodes must be great enough to generate the polarization current. In practice, when a voltage of sufficient strength is impressed on the point electrode, the conducting dielectric fluid in the neighborhood of the point electrode is attracted to the point electrode enough to somewhat (very slightly) compress the conducting dielectric fluid. This changes the dielectric property of the conducting fluid in the neighborhood of the point and a polarization change results which is a function of time. A field propagates as a result of this polarization change.

The configuration of FIG. 1A serves to minimize the conduction current which might otherwise be produced by the electrodes. This is because the body of material 4 is made of a nonconducting material so that the only conducting path between electrode 12 and electrode 20 is through the bore 8.

FIGS. 1B and 1C show side cross-sectional views of two species of the apparatus of FIG. 1A. In FIG. 1B, the bore 8 is of uniform diameter extending from about the electrode 12 to the end of the body 4. In FIG. 1C, the bore 8 of the body 4 has an enlargement 40 near the electrode 12. The enlargement is provided to impede, to some extent, the fluid from leaving the cavity as a result of the expansion of the fluid following the compression thereof.

Figure 2:
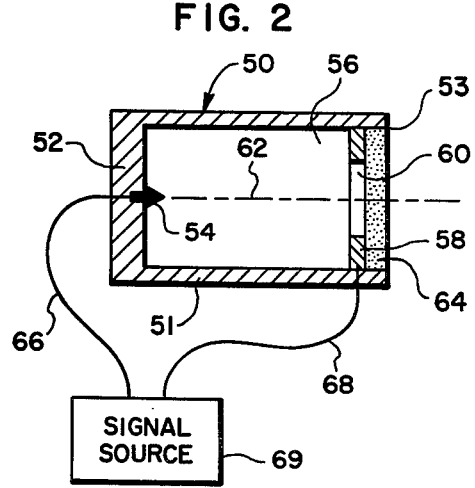
FIG. 2 is a side cross-sectional view of another embodiment of apparatus made in accordance with the principles of the present invention.

FIG. 2 shows a cross-sectional view of another embodiment of the invention. This embodiment includes a generally cylindrical housing 50 having side walls 51, an end wall 52 at one end of the housing, and an opening 53 at the other end. The housing 50 is constructed of a nonconducting material, as before. Disposed in the wall end 52 of the housing is a finger-like point electrode 54 which protrudes into a cavity 56 of the housing. Disposed near the open end of the housing 50 is a plane electrode 58 formed of a flat, generally annular plate having a central opening 60 formed therein. The electrode 58 is positioned within the housing 50 near the open end of the housing to be generally perpendicular to the cylinder axis 62. Disposed in the openings 53 of the housing 50 is a generally planar piece of porous material 64 constructed, for example, from a ceramic. The cavity 56 of the housing 50 is filled with a non-conducting fluid such as non-saline water. The porous material 64 is provided to prevent mixing of the external conducting dielectric fluid with the nonconducting fluid located in the cavity 56 while maintaining continuity of the dielectric.

Insulated conductors 66 and 68 are coupled respectively to the point electrode 54 through the end wall 52 of the housing 50, and to the plane electrode 58 through the side wall 51 of the housing. A signal source 69 provides time-varying voltage signals to the conductors as before to cause production of a time-varying non-uniform field which is propagated outwardly from the housing 50 along the axis 62.

Figure 3:
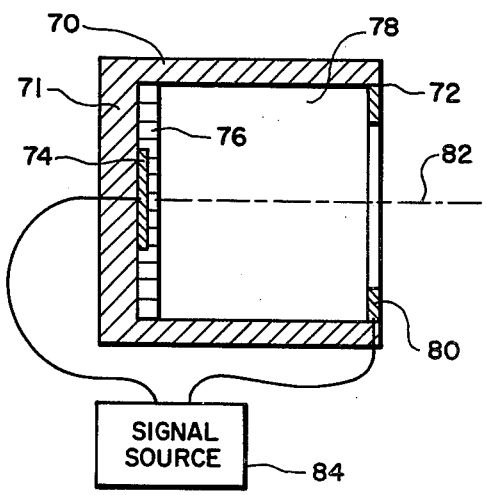
FIG. 3 is a side cross-sectional view of still another embodiment of the present invention.

Still another embodiment of the invention is shown in FIG. 3. This embodiment also includes a generally cylindrical housing 70 having side walls, one end wall 71, and an opening 72 disposed opposite the end wall. Disposed at the closed end of the housing 70 is a generally flat, plate electrode 74 which is mounted against the inside surface of the end wall 71 of the housing. A layer of insulating and sealing material 76 is placed over the electrode 74 to seal it from the conducting medium which enters the cavity 78 of the housing. In the layer of insulating and sealing material immediately over the plate electrode 74 is located a plurality of small apertures to permit limited electrical continuity of the conducting dielectric fluid with the plate electrode. The insulating material 76 could be made of a porous ceramic material such as unglazed clay which would inherently provide the desired small apertures.

Positioned in the opening 72 of the housing to generally circumscribe the opening is a plane electrode 80 again formed of a generally flat, annular plate having a central opening therein. The plane electrode 80 is oriented generally perpendicular to the cylindrical axis 82 of the housing 70. Again, a signal source 84 supplies voltage signals to the two electrodes of the apparatus.

Figure 4:
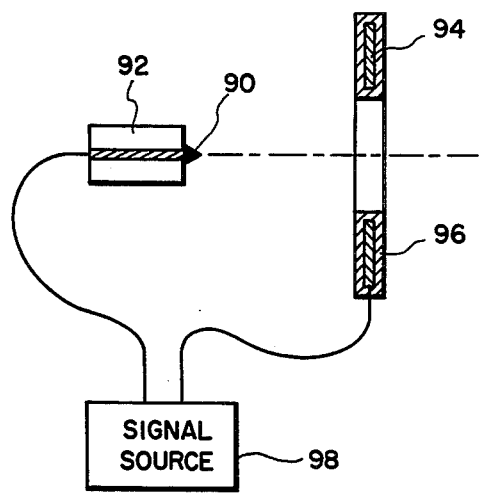
FIG. 4 is a side cross-sectional view of an additional embodiment of the present invention.

Another embodiment of the invention is shown in FIG. 4 to include a point electrode 90 disposed in a plug 92 of electrically insulating material. Unlike the other embodiments, the point electrode 90 in the embodiment of FIG. 4 is exposed to the conducting medium. However, a plane electrode 94 constructed of a generally flat, annular plate is encased in a porous insulating jacket 96. A signal source 98 is coupled to the point electrode 90 and the plane electrode 94 to produce the electric field therebetween.

Figure 5:
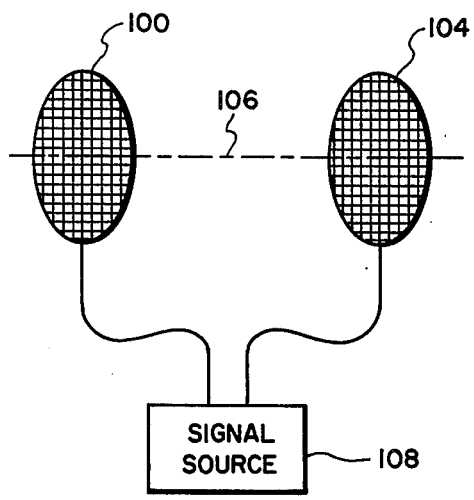
FIG. 5 is a perspective view of a further embodiment of the present invention.

FIG. 5 shows a further embodiment of the invention, with this embodiment including a pair of spaced apart generally flat screens 100 and 104, both constructed of a conducting material. The spacing of the wire elements of the screens 100 and 104 result in the production of non-uniform fields in the vicinity of the elements. The screens are positioned along an axis 106 so that the axis extends generally through the center of the screens 100 and 104. Additionally, the screens are positioned generally parallel to one another. One or both of the screens may be encased in an electrically insulating and sealing jacket having openings to allow limited electrical continuity of the fluid with the screens. A signal source 108 provides time-varying voltage signals to the electrodes 100 and 104 to again produce an electric field which will be propagated along the axis 106 in both directions.

Figure 6A:
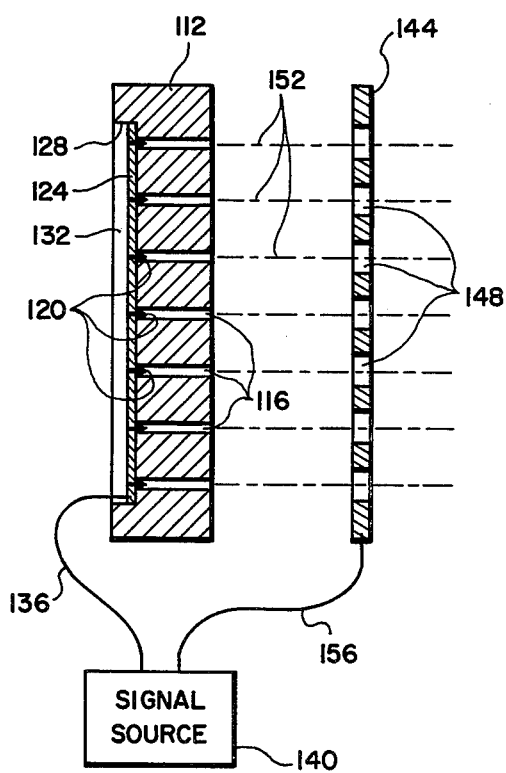
FIGS. 6A and 6B are a side cross-sectional view and an end view respectively of a final embodiment of the present invention.
Figure 6B:
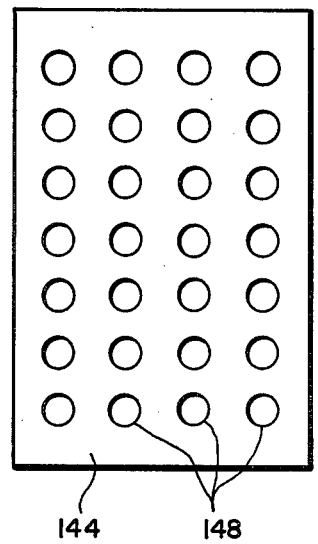

Finally, FIGS. 6A and 6B show a side cross-sectional view and an end view respectively of still a further embodiment of the invention. This embodiment includes a body of nonconducting material 112 having a plurality of bores 116 formed therein in a spaced-apart relation. Disposed in one end of each of the bores 116 is a point electrode 120. The point electrodes are mounted on a plate of conducting material 124 which, in turn, is disposed within a recess 128 formed in the back side of the body 112. Sealant material 132 covers the plate 124 and seals it from the conducting dielectric fluid. The plate 124 is coupled by way of an insulated conductor 136 to a signal source 140.

The embodiment of FIGS. 6A and 6B also includes a plane electrode 144 constructed of a generally flat conducting plate. A plurality of openings 148 are formed in the plate 144. The plate 144 is oriented to be generally perpendicular to axes 152 of the bores 116 and so that these axes extend geometrically through the openings 148. The plate 144 is coupled by an insulated conductor 156 to the signal source 140.

Again, the signal source 140 provides time-varying voltage signals to the conductors 136 and 156 to thereby produce a plurality of time-varying non-uniform fields between the point electrodes 120 and plane electrode 144, which fields are propagated outwardly along the axes 152.

An alternative plane electrode configuration for the FIGS. 6A and 6B embodiment is to provide an annular plate (similar to electrode 20 in FIG. 1A) in place of the electrode 144 of FIG. 6A. The opening of such annular plate would have a diameter greater than the width and height of the body 112. The annular plate would be positioned in substantially the same position as is plate 144 of FIG. 6A, with the center of the annular plate being disposed in alignment with the center of the body 112.

Still another alternative plane electrode configuration for the FIGS. 6A and 6B embodiment is provision of a generally flat rectangular screen (similar to the screens 100 and 104 of FIG. 5) in place of the electrode 144 of FIG. 6A. The height and width dimensions of the screen would be substantially the same as the height and width dimensions of the body 112 and the screen would be constructed of a conductive material and covered with a porous insulative material.

Although not part of the present invention, exemplary receiver apparatus for detecting the signals propagated by the signal propagating devices shown and described could include a conventional dipole antenna.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. Apparatus for producing an electrical signal for transmission through a conducting dielectric fluid comprising
    a first electrode immersed in the fluid coincident with a certain axis, said electrode having predetermined height and width dimensions,
    a second electrode immersed in the conducting fluid along said axis and axially spaced from said first electrode, said second electrode having a generally planar profile with height and width dimensions greater than the height and width dimensions of said first electrode,
    means for applying electrical energy to said first and second electrodes to produce a time-varying voltage difference and thus a non-uniform electric field therebetween.

2. Apparatus as in claim 1 wherein said second electrode is disposed in a plane which is generally perpendicular to said axis.

3. Apparatus as in claim 2 wherein said second electrode comprises an annular plate having a central opening through which said axis extends.

4. Apparatus as in claim 3 wherein said first electrode comprises a solid finger-like element.

5. Apparatus as in claim 4 further including an elongate body member having a bore formed therein, said bore extending from near one end of the body member to the other end thereof, said first electrode being disposed in the body member at said one end to protrude into the bore, and said body member being positioned so that the bore is coincident with said axis, with said other end of the body member being nearest said second electrode.

6. Apparatus as in claim 5 wherein said first electrode is partially covered and sealed off from the conducting fluid by an electrical insulating material.

7. Apparatus as in claim 6 wherein the bore in said body member is enlarged at said one end.

8. Apparatus as in claim 4 further including a porous sealing jacket disposed about and covering said second electrode to partially seal it from the conducting fluid.

9. Apparatus as in claim 4 further including
    a housing formed with side walls, an end wall at one end thereof, and an opening at the other end thereof,
    a porous plug member disposed over the opening in the housing,
    a nonconducting fluid carried in said housing,
    wherein said plug member being sufficiently nonporous to prevent mixing of said nonconducting fluid with the conducting dielectric fluid,
    wherein said second electrode is disposed within said housing adjacent said plug member, and
    wherein said first electrode is disposed in the end wall of said housing to protrude into the interior of the housing.

10. Apparatus as in claim 3 further including a housing formed with side walls, an end wall at one end thereof, and an opening at the other end thereof, wherein said second electrode is disposed within said housing to generally circumscribe said opening, wherein said first electrode comprises a plate disposed within said housing adjacent the end wall thereof, said apparatus further including a sealing jacket disposed about and covering said first electrode to seal it from the conducting fluid.

11. Apparatus as in claim 2 wherein said second electrode is comprised of a screen mesh material, wherein said first electrode is comprised of a screen mesh material having a generally planar profile, the screen mesh material of the first electrode defining a plane which is generally perpendicular to said axis, said apparatus further including a porous jacket disposed about and covering either said first or second electrode.

12. Apparatus for producing an electrical signal for transmission through a conducting dielectric fluid comprising
    a plurality of spaced-apart first electrodes disposed generally in a plane and immersed in the fluid so that each of the first electrodes is coincident with a different axis,
    a second electrode comprised of a generally planar conducting element, said second electrode being immersed in the fluid so that the plane in which the first electrodes are disposed is generally parallel to the plane defined by said second electrode, and
    means for applying electrical energy to said first and second electrodes to produce a time-varying voltage difference therebetween.

13. Apparatus as in claim 12 wherein said second electrode is comprised of a conducting plate having a plurality of openings therein, said plate being immersed in the fluid so that each of said axes extends through a different one of said openings.

14. Apparatus as in claim 12 wherein said second electrode is comprised of an annular conducting plate having a central opening therein.

15. Apparatus as in claim 12 wherein said second electrode is comprised of a screen mesh material and a porous sealing jacket disposed about and covering said screen mesh material.

16. Apparatus as in claim 12 further comprising a body of nonconducting material having a plurality of bores formed therein, said bores extending from near one side of said body to the other side thereof, said first electrodes being disposed in the body at said one side to protrude into respective ones of said bores, and said body being positioned so that the bores are coincident with respective ones of said axes.

17. A method of producing and propagating an electrical signal through a conducting dielectric fluid comprising immersing in the fluid a first electrode having certain height and width dimensions, said electrode being located coincident with a certain axis, immersing in the fluid a second electrode along said axis, spaced apart from said first electrode along the axis, and having a generally planar profile with height and width dimensions greater than the height and width dimensions of said first electrode, and applying time-varying electrical energy to said first and second electrodes to thereby produce a time-varying voltage difference and thus a non-uniform electric field therebetween.

* * * * *